United States Patent Office 3,354,206
Patented Nov. 21, 1967

3,354,206
10,11-DIHYDRO-5-HYDROXY-5-VINYL-5H-
DIBENZO-[a,d]CYCLOHEPTENES
Norman L. Wendler, Summit, and Robert D. Hoffsommer, Jr., and David Taub, Metuchen, N.J., assignors to Merck & Co., Inc., Rahway, N.J., a corporation of New Jersey
No Drawing. Continuation of application Ser. No. 318,165, Oct. 23, 1963. This application Apr. 26, 1967, Ser. No. 634,439
17 Claims. (Cl. 260—556)

ABSTRACT OF THE DISCLOSURE

The invention is directed to 10,11-dihydro-5-hydroxy-5-vinyl-5H-dibenzo[a,d]cycloheptenes and their unsaturated form which are intermediates in the preparation of anti-depressants and tranquilizers.

---

This application is a continuation of application Serial No. 318,165, filed October 23, 1963, now abandoned.

This invention relates to the preparation of compounds which are useful as intermediates in the preparation of dibenzocycloheptenes. In particular, the invention relates to a method for the preparation of 5-cyclopropyl-5-hydroxy derivatives of dibenzocycloheptenes which, in turn, may be readily converted to 5H-dibenzo[a,d]cycloheptenes and 10,11-dihydro-5H-dibenzo[a,d]cycloheptenes which are substituted at the 5-position with a tertiary aminopropylidene radical. These latter compounds are useful in the field of mental health in that they are active as anti-depressants and/or tranquilizers.

In accordance with the process of the present invention, a dibenzocyclohepten-5-one is reacted with a Grignard reagent derived from a vinyl halide and the resulting Grignard adduct hydrolyzed to form the 5-hydroxy-5-vinyl-dibenzocycloheptene derivative. The latter vinyl carbinol is then treated with methylene iodide in the presence of a copper-zinc couple. This process may be illustrated as follows:

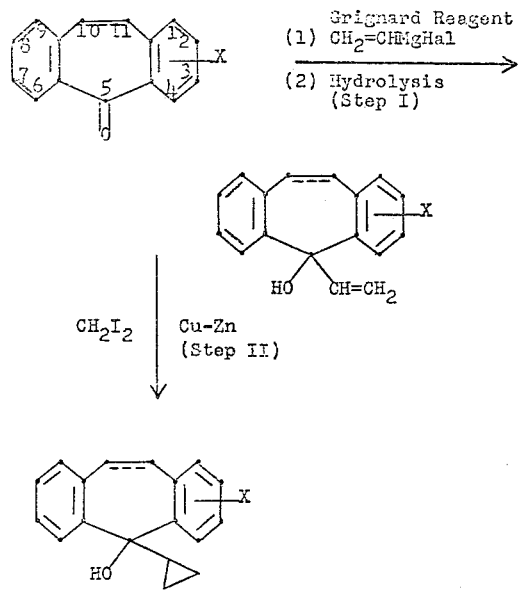

wherein X may be hydrogen, halogen, loweralkoxy, diloweralkylsulfamoyl, loweralkylmercapto and loweralkylsulfonyl; and Hal represents halogen and is preferably chlorine or bromine. The dotted line indicates that the compounds may be saturated or unsaturated at the 10,11-positions.

The Grignard reagent employed in Step I of the process may be prepared by known procedures, but it has been found that it may be prepared in high yields as follows:

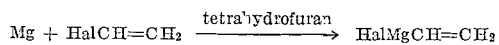

It has been found that the use of tetrahydrofuran as the solvent for the reaction results in rapid production of the Grignard reagent in high yield.

The reaction of the ketone with the Grignard reagent (Step I) is initially carried out at temperatures below 50° C., and preferably in the range of 40 to 50° C. Higher temperatures may be utilized with caution and temperatures below 40° C. may also be employed providing that the temperature is not too low so as to cause precipitation of the Grignard reagent. The temperature may be adjusted by the use of an ice-bath or by controlling the rate of addition of one of the reactants to the mixture. The reaction is preferably carried out in a solvent and it has been found that tetrahydrofuran is excellent for this purpose. Accordingly, the ketone may be added directly to the reaction mixture in which the Grignard reagent is prepared. However, any inert, organic solvent may be utilized. Hydrolysis of the resulting Grignard adduct is carried out in such a way that strongly acidic conditions are avoided. Hydrolysis can be conveniently effected with a saturated ammonium chloride solution, although water alone may be sufficient.

In Step II of the process, the vinyl carbinol is reacted with methylene iodide in the presence of a zinc-copper couple. In carrying out this reaction, it is preferred to employ a substantially anhydrous, inert organic solvent. Suitable solvents include ethers such as ethyl ether, tetrahydrofuran and the like. The temperature at which the reaction is run is not critical. Preferably, the reaction is carried out at the reflux temperature of the system. The product is readily recovered in conventional manner.

The ketones employed in the above process may be readily prepared following the procedure described in the literature or in the examples hereinbelow. The conversion of the 5-hydroxy-5-cyclopropyl derivatives of dibenzocycloheptenes prepared by the process of this invention to the corresponding dibenzocycloheptenes which are substituted at the 5-position with a tertiary aminopropylidene radical, may be accomplished utilizing the process described by R. D. Hoffsommer, D. Taub and N. L. Wendler in the J. Org. Chem., 27, 4134 (1962).

The process of the present invention is more fully described in the following examples. It is to be understood, however, that the examples are illustrative only and are not to be construed as limiting the invention.

*Example 1.—10,11-dihydro-5-hydroxy-5-vinyl-5H-dibenzo[a,d]cycloheptene*

A 100 ml. 3-necked flask with stirrer, Dry Ice-acetone condenser with nitrogen inlet, and addition funnel is charged with 1.17 g. (48 millimoles) of magnesium turnings. The system is "flamed-out" with a heat gun and cooled under dry nitrogen. The magnesium metal is covered with 10 ml. of dry tetrahydrofuran (THF) and 2-3 ml. of a solution of 5.25 g. (49 millimoles) of vinyl bromide in 10 ml. of THF is added. The reaction mixture is warmed slightly until reaction begins, after which the vinyl bromide solution is added dropwise, with stirring, at such a rate as to maintain a temperature of 50–60° C. The addition is complete in 15 minutes, after which the reaction mixture is stirred under gentle reflux until all of the magnesium is consumed (2 hours). A solution of 5.0 g. (24 millimoles) of 10,11-dihydro-5H-dibenzo[a,d]cyclohepten-5-one in 25 ml. of THF is added, with stirring, to the warm reaction mixture at a rate sufficient to maintain a temperature of 40–50° C. The addition is complete in 25 minutes, accompanied by considerable darkening of the reaction mixture. Stirring and heating (50° C.) are continued for 1 hour. At the end of this time a thin-layer chromatographic probe indicates that the reaction is complete. The reaction mixture is chilled in an ice-bath and treated, dropwise, with 25 ml. of saturated ammonium chloride solution. The aqueous layer is extracted with two 15 ml. portions of ether and the combined ether-THF solutions are washed with 15 ml. of saturated sodium chloride solution, dried over anhydrous magnesium sulfate, and taken to dryness in vacuo to yield 5.90 g. of yellow oil which exhibits the following properties:

$\lambda_{max.}^{CHCl_3}$ 2.70, 2.87, 6.18, 6.75, 6.9, 7.13, 7.62, 7.9, 8.63, 9.0, 9.48, 9.83 and 10.35μ

$\lambda_{max.}^{MeOH}$ 2730 (sh.), ($E_{cm.}^{1\%}$ 19.9); 2700 (sh.), ($E_{cm.}^{1\%}$ 23.6); 2660 (sh.), ($E_{cm.}^{1\%}$ 27.3); and 2630 ($E_{cm.}^{1\%}$ 29.2)

*Example 2.—5-cyclopropyl-10,11-dihydro-5-hydroxy-5H-dibenzo[a,d]cycloheptene*

A 50 ml. 3-necked flask fitted with a stirrer, condenser bank, and addition funnel is purged with dry nitrogen and charged with 1.53 g. of the copper-zinc couple (prepared by the procedure of R. S. Shank and H. Shechter, J. Org. Chem., 24, 1825 [1959]), 15 ml. of dry ethyl ether, and two crystals of iodine. Methylene iodide (4.90 g., 18.3 millimoles) is added and the reaction mixture warmed to a gentle reflux which is maintained for 30 minutes. The reaction mixture is then cooled slightly and 2.00 g. (8.46 millimoles) of 10,11 - dihydro-5-hydroxy-5-vinyl-5H-dibenzo[a,d]cycloheptene in 5 ml. of dry ethyl ether added slowly, with stirring, over 25 minutes. The reaction mixture is then stirred and refluxed for 2¼ hours. The reaction mixture is cooled to room temperature and treated with 15 ml. of saturated ammonium chloride solution. The aqueous layer is extracted with two portions of ether and the combined ether solutions washed with two 15 ml. portions of saturated potassium carbonate solution, 15 ml. of saturated sodium chloride solution, dried over anhydrous magnesium sulfate and concentrated in vacuo to 2.26 g. of yellow oil. The crude oil is re-dissolved in ether, treated with charcoal, filtered through Celite, and the ether replaced with hexane while concentrating to small volume. Seeding the solution with a crystal of authentic 10,11 - dihydro - 5 - hydroxy - 5 - cyclopropyl - 5H - dibenzo[a,d]cycloheptene yields 660 mg. of crystalline product with a M.P., 68–69.5° C. The authentic sample had a M.P., 69–71° C. A mixture of the product crystals and authentic sample did not depress the M.P., 68–71° C. An additional 450 mg. of cyclopropyl carbinol is obtained by chromatography of the mother liquor to afford a total yield of 52% over the two steps.

*Example 3.—3 - methylmercapto - 5H - dibenzo[a,d]cyclohepten-5-one*

*Step A. Preparation of cuprous methylmercaptide.*—Concentrated ammonium hydroxide solution, 300 ml., is placed in a 1 liter, 3-necked flask fitted with a stirrer and gas inlet tube. The apparatus is cooled in an ice-bath and flushed with dry nitrogen while 40.0 g. (0.40 mole) of cuprous chloride is added portionwise with stirring. To the dark blue solution is added 95% ethanol, 300 ml., and then methylmercaptan is bubbled into the cooled solution until precipitation is complete and the supernatant solution becomes yellow. The solid is collected and washed by centrifugation with four portions of dilute ammonium hydroxide solution, followed by four portions of absolute ethanol. The yellow product is dried under reduced pressure at 45–50° C. and finally in a vacuum desiccator over concentrated sulfuric acid. The yield of product is 41.4 g. (93%).

*Step B. Preparation of 3-methylmercapto-5H-dibenzo[a,d]cyclohepten - 5 - one.*—3 - bromo - 5H - dibenzo[a,d]cyclohepten - 5 - one, 7.93 g. (0.028 mole), and cuprous methylmercaptide, 4.01 g. (0.036 mole), prepared as described in Step A, are put in a 100 ml. flask fitted with a stirrer and reflux condenser. Quinoline, 44.8 ml., and pyridine, 4.0 ml., are added and the slurry is heated at 200° C. with stirring for six hours. The reaction mixture is poured into 6 N hydrochloric acid, 120 ml., and ice, and extracted with five 150 ml. portions of boiling benzene. The combined extracts are washed with three 200 ml. portions of 3 N hydrochloric acid. After washing with water, the solvent is evaporated under reduced pressure leaving a brown oil, weight 7.41 g., as residue. The oil is dissolved in absolute methanol, 125 ml., and boiled with 370 mg. decolorizing carbon for thirty minutes. The filtrate is concentrated to 60 ml. and a yellow solid separates, along with a brown oil. The solid is mechanically separated from the oil and dried in a vacuum desiccator over concentrated sulfuric acid. The product weighs 2.77 g. and melts at 66.5–67.5° C. The brown oil is evaporatively distilled at 146° C./0.1 mm. and the sublimate is crystallized from 25 ml. of absolute methanol to give 2.65 g. of material melting at 66.5–67.5° C. (77% yield).

*Analysis.*—Calcd. for $C_{16}H_{12}OS$: C, 76.16; H, 4.80; S, 12.71. Found: C, 76.35; H, 4.61; S, 12.60.

*Example 4.—10,11-dihydro-3-methylmercapto-5H-dibenzo[a,d]cyclohepten-5-one*

Following the procedure of Example 3, Step B, and employing an equivalent amount of 3-bromo-10,11-dihydro-5H-dibenzo[a,d]cyclohepten-5-one in place of 3-bromo-5H-dibenzo[a,d]cyclohepten-5-one, there is obtained 10,11 - dihydro-3-methylmercapto-5H-dibenzo[a,d]cyclohepten-5-one.

*Example 5.—3-methylsulfonyl-5H-dibenzo[a,d]cyclohepten-5-one*

3 - methylmercapto-5H-dibenzo[a,d]cyclohepten-5-one (10.70 g., 0.042 mole) is dissolved in 35 ml. of glacial acetic acid. Hydrogen peroxide (30%, 15 ml.) is added and the solution is stirred at room temperature for 65 hours. The white solid that precipitates is collected and dried to yield 10.81 g. (91%) of product melting at 158–159° C. An analytical sample from a previous experiment melts at 155–157.5° C. after recrystallization from 95% ethanol.

*Analysis.*—Calcd. for $C_{16}H_{12}O_3S$: C, 67.59; H, 4.26; S, 11.28. Found: C, 67.62; H, 4.25; S, 11.41.

*Example 6.—10,11-dihydro-3-methylsulfonyl-5H-dibenzo[a,d]cyclohepten-5-one*

Following the procedure of Example 5, and employing an equivalent amount of 10,11-dihydro-3-methylmercapto-5H-dibenzo[a,d]cyclohepten-5-one in place of 3-methylmercapto-5H-dibenzo[a,d]cyclohepten-5-one, there is obtained 10,11-dihydro-3-methylsulfonyl-5H-dibenzo[a,d]cyclohepten-5-one.

*Example 7.—10,11-dihydro-3-dimethylsulfamoyl-5H-dibenzo[a,d]cyclohepten-5-one*

*Step A. 7-bromo-3-fluorosulfonyl-10,11-dihydro-5H-dibenzo[a,d]cyclohepten-5-one.*—Fluorosulfonic acid, 100 ml., is placed in a 300 ml. 3-necked round bottom flask equipped with polyethylene inlet tube and polyethylene exit tube with drying tube half-filled with anhydrous sodium fluoride. A nitrogen atmosphere is maintained throughout the reaction. With stirring, 17.0 g. (0.059 mole) of 3-bromo-10,11-dihydro-5H-dibenzo[a,d]cyclohepten-5-one is added in portions over 20 minutes. After stirring another 10 minutes, the dark green solution is heated on the steam-bath for 6½ hours. The mixture then is cooled to room temperature, poured cautiously with stirring into 1.5 kg. of crushed ice, and allowed to stand overnight at room temperature. The brown solid is collected, washed with water, dried in a vacuum desiccator over sodium hydroxide, and then extracted in a Sohxlet extractor with 700 ml. of boiling cyclohexane for 16 hours. On cooling, the cyclohexane extract deposits 11.65 g. (53%) of 7-bromo-3-fluorosulfonyl-10,11-dihydro-5H-dibenzo[a,d]cyclohepten-5-one as dark yellow flakes, M.P. 148–151° C. Recrystallizations from ether and cyclohexane give an analytical sample, M.P. 150–152° C.

*Analysis.*—Calcd. for $C_5H_{10}O_3FBrS$: C, 48.79; H, 2.73; S, 8.69. Found: C, 48.78; H, 2.83; S, 8.87.

*Step B. 7 - bromo-10,11-dihydro-3-dimethylsulfamoyl-5H-dibenzo[a,d]cyclohepten-5-one.*—7 - bromo-10,11-dihydro - 3 - fluorosulfonyl - 5H - dibenzo[a,d]cyclohepten-5-one (2.5 g., 0.00677 mole) together with 30 ml. of 25% aqueous dimethylamino and 30 ml. of p-dioxane is heated to refluxing for 3 hours. The brown solution is evaporated to dryness under reduced pressure and the residue partitioned between benzene and water. After washing with water, the benzene layer is evaporated to dryness under reduced pressure, leaving 7-bromo-10,11-dihydro-3-dimethylsulfamoyl-5H - dibenzo[a,d]cyclohepten-5-one as a tan solid, M.P. 142–145° C., in a yield of 2.1 g. (80%). An analytical sample melts at 146–148° C. after crystallizations from mixtures of benzene and hexane and from methanol.

*Analysis.*—Calcd. for $C_{17}H_{16}O_3NBrS$: C, 51.78; H, 4.09; N, 3.55. Found: C, 51.71; H, 4.12; N, 3.53.

*Step C. 10,11-dihydro-3-dimethylsulfamoyl-5H-dibenzo-[a,d]cyclohepten-5-one.*—7-bromo - 10,11-dihydro-3-dimethylsulfamoyl-5H-dibenzo[a,d]cyclohepten - 5 - one, 8.0 g. (0.0203 mole), is dissolved in a mixture of 100 ml. of absolute ethanol, 70 ml. of dimethylformamide, and 5 ml. of triethylamine. The solution is hydrogenated at atmospheric pressure and in the presence of 600 mg. of 10% palladium on charcoal catalyst until hydrogen uptake is complete. Catalyst is removed by filtration and washed with absolute ethanol. The filtrate is evaporated to dryness under reduced pressure and the residue triturated with benzene. The insoluble triethylamine hydrobromide is filtered and the benzene filtrate evaporated to dryness under reduced pressure. Crystallization of the residual white solid from absolute ethanol affords 6.1 g. (97%) of 10,11-dihydro-3-dimethylsulfamoyl-5H-dibenzo[a,d]cyclohepten-5-one, M.P. 122–124° C. The melting point is unchanged after crystallization from absolute ethanol.

*Analysis.*—Calcd. for $C_{17}H_{17}O_3NS$: C, 64.74; H, 5.44; N, 4.44. Found: C, 64.20; H, 5.47; N, 4.16.

*Example 8.—3-dimethylsulfamoyl-5H-dibenzo[a,d] cyclohepten-5-one*

A mixture of 10,11 - dihydro-3-dimethylsulfamoyl-5H-dibenzo[a,d]cyclohepten-5-one (6.1 g., 0.0194 mole), N-bromosuccinimide (3.6 g., 0.029 mole), benzoyl peroxide (50 mg.), and 50 ml. of benzene is stirred and heated to refluxing for 3 hours. The precipitated succinimide is filtered and washed with warm benzene. After washing with 5% aqueous sodium hydroxide and then with water, the benzene filtrate is evaporated to dryness under reduced pressure. The residual oily solid is suspended in 75 ml. of triethylamine and the mixture stirred at reflux for 16 hours. Triethylamine is evaporated under reduced pressure and the residual solid partitioned between benzene and water. The benzene layer is separated, washed with 3 N hydrochloric acid and then with water, and evaporated to dryness under reduced pressure. Crystallization of the residual solid from 95% ethanol gives 2.83 g. (46.5%) of 3 - dimethylsulfamoyl-5H-dibenzo[a,d]cyclohepten-5-one, M.P. 129.5–135.5° C. An analytical sample melts at 138.5–139.5° C. after repeated crystallizations from 95% ethanol.

*Analysis.*—Calcd. for $C_{17}H_{15}O_3NS$: C, 65.16; H, 4.83; N, 4.47. Found: C, 64.88; H, 4.85; N, 4.11.

*Example 9*

Following the procedure of Example 1 and employing an equivalent amount of the ketone designated below in place of 10,11 - dihydro-5H-dibenzo[a,d]cyclohepten-5-one, there is obtained the products enumerated below.

| Ketone | Product |
|---|---|
| 3-methylmercapto-5H-dibenzo-[a,d]cyclohepten-5-one. | 5-hydroxy-3-methylmercapto-5-vinyl-5H-dibenzo[a,d]cycloheptene. |
| 10,11-dihydro-3-methylmercapto-5H-dibenzo[a,d]-cyclohepten-5-one. | 10,11-dihydro-5-hydroxy-3-methylmercapto-5-vinyl-5H-dibenzo[a,d]-cycloheptene. |
| 3-chloro-5H-dibenzo[a,d]-cyclohepten-5-one. | 3-chloro-5-hydroxy-5-vinyl-5H-dibenzo[a,d]-cycloheptene. |
| 10,11-dihydro-3-methoxy-5H-dibenzo[a,d]cyclohepten-5-one. | 10,11-dihydro-5-hydroxy-3-methoxy-5-vinyl-5H-dibenzo-[a,d]-cycloheptene. |
| 5H-dibenzo[a,d]cyclohepten-5-one. | 5-hydroxy-5-vinyl-5H-dibenzo-[a,d]cycloheptene. |
| 3-methoxy-5H-dibenzo[a,d]-cyclohepten-5-one. | 5-hydroxy-3-methoxy-5-vinyl-5H-dibenzo[a,d]-cycloheptene. |
| 3-chloro-10,11-dihydro-5H-dibenzo-[a,d]cyclohepten-5-one. | 3-chloro-10,11-dihydro-5-hydroxy-5-vinyl-5H-dibenzo[a,d]cycloheptene. |
| 3-methylsulfonyl-5H-dibenzo-[a,d]cyclohepten-5-one. | 5-hydroxy-3-methylsulfonyl-5-vinyl-5H-dibenzo[a,d]-cycloheptene. |
| 10,11-dihydro-3-methylsulfonyl-5H-dibenzo[a,d]-cyclohepten-5-one. | 10,11-dihydro-5-hydroxy-3-methylsulfonyl-5-vinyl-5H-dibenzo-[a,d]cycloheptene. |
| 3-dimethylsulfamoyl-5H-dibenzo-[a,d]cyclohepten-5-one. | 3-dimethylsulfamoyl-5-hydroxy-5-vinyl-5H-dibenzo[a,d]cycloheptene. |
| 10,11-dihydro-3-dimethylsulfamoyl-5H-dibenzo[a,d]-cyclohepten-5-one. | 10,11-dihydro-3-dimethylsulfamoyl-5-hydroxy-5-vinyl-5H-dibenzo[a,d]-cycloheptene. |

*Example 10*

Following the procedure of Example 2 and employing an equivalent amount of the vinyl carbinol designated below in place of 10,11-dihydro-5-hydroxy-5-vinyl-5H-dibenzo[a,d]cycloheptene, there is obtained the products enumerated below.

| Vinyl Carbinol | Product |
|---|---|
| 5-hydroxy-3-methylmercapto-5-vinyl-5H-dibenzo[a,d]-cycloheptene. | 5-cyclopropyl-5-hydroxy-3-methylmercapto-5H-dibenzo[a,d]-cycloheptene. |
| 10,11-dihydro-5-hydroxy-3-methylmercapto-5-vinyl-5H-dibenzo[a,d]cycloheptene. | 5-cyclopropyl-10,11-dihydro-5-hydroxy-3-methylmercapto-5H-dibenzo[a,d]cycloheptene. |
| 3-chloro-5-hydroxy-5-vinyl-5H-dibenzo[a,d]-cycloheptene. | 3-chloro-5-cyclopropyl-5-hydroxy-5H-dibenzo-[a,d]cycloheptene. |
| 10,11-dihydro-5-hydroxy-3-methoxy-5-vinyl-5H-dibenzo-[a,d]-cycloheptene. | 5-cyclopropyl-10,11-dihydro-5-hydroxy-3-methoxy-5H-dibenzo-[a,d]-cycloheptene. |
| 5-hydroxy-5-vinyl-5H-dibenzo-[a,d]cycloheptene. | 5-cyclopropyl-5-hydroxy-5H-dibenzo[a,d]cycloheptene. |
| 5-hydroxy-3-methoxy-5-vinyl-5H-dibenzo[a,d]-cycloheptene. | 5-cyclopropyl-5-hydroxy-3-methoxy-5H-dibenzo[a,d]-cycloheptene. |
| 3-chloro-10,11-dihydro-5-hydroxy-5-vinyl-5H-dibenzo[a,d]-cycloheptene. | 3-chloro-5-cyclopropyl-10,11-dihydro-5-hydroxy-5H-dibenzo-[a,d]cycloheptene. |
| 5-hydroxy-3-methylsulfonyl-5-vinyl-5H-dibenzo[a,d]cycloheptene. | 5-cyclopropyl-5-hydroxy-3-methylsulfonyl-5H-dibenzo[a,d]-cycloheptene. |
| 10,11-dihydro-5-hydroxy-3-methylsulfonyl-5-vinyl-5H-dibenzo-[a,d]-cycloheptene. | 5-cyclopropyl-10,11-dihydro-5-hydroxy-3-methylsulfonyl-5H-dibenzo[a,d]cycloheptene. |
| 3-dimethylsulfamoyl-5-hydroxy-5-vinyl-5H-dibenzo[a,d]cycloheptene. | 5-cyclopropyl-3-dimethylsulfamoyl-5-hydroxy-5H-dibenzo-[a,d]cycloheptene. |
| 10,11-dihydro-3-dimethylsulfamoyl-5-hydroxy-5-vinyl-5H-dibenzo[a,d]cycloheptene. | 5-cyclopropyl-10,11-dihydro-3-dimethylsulfamoyl-5-hydroxy-5H.dibenzo[a,d]cycloheptene. |

We claim:
1. A compound of the formulae:

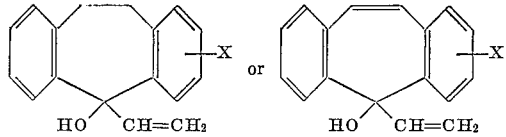

wherein X is hydrogen, halogen, loweralkoxy loweralkyl-sulfonyl or diloweralkylsulfamoyl.

2. A compound of the formula:

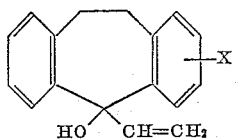

wherein X is hydrogen, halogen, loweralkoxy, loweralkylsulfonyl or diloweralkylsulfamoyl.

3. A compound of the formula:

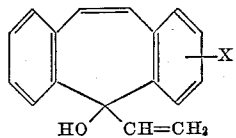

wherein X is hydrogen, halogen, loweralkoxy, loweralkylsulfonyl or diloweralkylsulfamoyl.

4. The compound of claim 1 wherein X is halogen.
5. The compound of claim 1 wherein X is lower-alkylsulfonyl.
6. 10,11 - dihydro - 5-hydroxy-5-vinyl-5H-dibenzo[a,d]cycloheptene.
7. 5-hydroxy-5-vinyl-5H-dibenzo[a,d]cycloheptene.
8. 3 - chloro-5-hydroxy-5-vinyl-5H-dibenzo[a,d]cycloheptene.
9. 5-hydroxy-3-methylsulfonyl-5-vinyl-5H-dibenzo[a,d]cycloheptene.
10. 10,11 - dihydro - 5 - hydroxy-3-methylsulfonyl-5-vinyl-5H-dibenzo[a,d]cycloheptene.
11. 3 - chloro - 10,11 - dihydro-5-hydroxy-5-vinyl-5H-dibenzo[a,d]cycloheptene.
12. 5 - hydroxy - 3 - methoxy-5-vinyl-5H-dibenzo[a,d]cycloheptene.
13. 3 - dimethylsulfamoyl - 5 - hydroxy-5-vinyl-5H-dibenzo[a,d]cycloheptene.
14. 10,11 - dihydro - 3 - dimethylsulfamoyl-5-hydroxy-5-vinyl-5H-dibenzo[a,d]cycloheptene.
15. 5 - hydroxy - 3 - methylmercapto-5-vinyl-5H-dibenzo[a,d]cycloheptene.
16. 10,11 - dihydro - 5 - hydroxy-3-methylmercapto-5-vinyl-5H-dibenzo[a,d]cycloheptene.
17. 10,11 - dihydro - 5 - hydroxy-3-methoxy-5-vinyl-5H-dibenzo[a,d]cycloheptene.

References Cited

Hoffsommer et al., J. Org. Chem., vol. 27, pp. 4134–4137 (1962).

Hoffsommer et al., J. Org. Chem., vol. 28, p. 1752 (July 1963).

JOHN D. RANDOLPH, *Primary Examiner.*

HARRY I. MOATZ, *Assistant Examiner.*